(12) United States Patent
Wang et al.

(10) Patent No.: US 11,507,222 B2
(45) Date of Patent: Nov. 22, 2022

(54) DISPLAYING BASE PLATE AND DISPLAYING DEVICE

(71) Applicants: Chengdu BOE Optoelectronics Technology Co., Ltd., Sichuan (CN); BOE Technology Group Co., Ltd., Beijing (CN)

(72) Inventors: Zhu Wang, Beijing (CN); Fei Fang, Beijing (CN); Weiqing Li, Beijing (CN); Zhenglong Yan, Beijing (CN); Ling Shi, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 17/333,089

(22) Filed: May 28, 2021

(65) Prior Publication Data

US 2022/0100342 A1 Mar. 31, 2022

(30) Foreign Application Priority Data

Sep. 29, 2020 (CN) .......................... 202011050568.6

(51) Int. Cl.
*G06F 3/041* (2006.01)

(52) U.S. Cl.
CPC ........ *G06F 3/04164* (2019.05); *G06F 3/0412* (2013.01); *G06F 2203/04107* (2013.01)

(58) Field of Classification Search
None
See application file for complete search history.

(56) References Cited

U.S. PATENT DOCUMENTS

2020/0176540 A1\* 6/2020 Park ..................... G09G 3/3225

\* cited by examiner

*Primary Examiner* — Brian M Butcher
(74) *Attorney, Agent, or Firm* — WHDA, LLP (57) ABSTRACT

A displaying base plate and a displaying device, wherein the displaying base plate includes a displaying region, a binding region, and a fanout region located between the displaying region and the binding region, the fanout region includes a touch-controlling lead wire, a data lead wire, and at least one shielding wire located between the touch-controlling lead wire and the data lead wire, the at least one shielding wire includes a first shielding wire, and the first shielding wire is earthed or is connected to a constant electric potential.

16 Claims, 5 Drawing Sheets

DISPLAYING BASE PLATE AND DISPLAYING DEVICE

CROSS REFERENCE TO RELEVANT APPLICATIONS

The present disclosure claims the priority of the Chinese patent application filed on Sep. 29, 2020 before the Chinese Patent Office with the application number of 202011050568.6 and the title of "DISPLAYING BASE PLATE AND DISPLAYING DEVICE", which is incorporated herein in its entirety by reference.

TECHNICAL FIELD

The present disclosure relates to the technical field of displaying, and particularly relates to a displaying base plate and a displaying device.

BACKGROUND

The most important characteristic of Touch and Display Driver Integration (TDDI) is the integration of the touch-controlling chip and the displaying chip into the same one chip, and the touch-controlling operation is based on the principle of self-containing.

SUMMARY

The present disclosure provides a displaying base plate and a displaying device.

The present disclosure provides a displaying base plate, wherein the displaying base plate comprises a displaying region, a binding region, and a fanout region located between the displaying region and the binding region; and the fanout region comprises a touch-controlling lead wire, a data lead wire, and at least one shielding wire located between the touch-controlling lead wire and the data lead wire, the at least one shielding wire includes a first shielding wire, and the first shielding wire is earthed or is connected to a constant electric potential.

In an alternative implementation, the fanout region comprises a plurality of instances of the shielding wire, the plurality of shielding wires include a second shielding wire, the second shielding wire is provided closer to the touch-controlling lead wire, the first shielding wire is provided closer to the data lead wire, and the second shielding wire is configured for transmitting a signal the same as a touch-controlling signal in the touch-controlling lead wire.

In an alternative implementation, first ends of the shielding wires are connected to different pins, and the pins are located at the binding region.

In an alternative implementation, second ends of the shielding wires are provided closer to the displaying region.

In an alternative implementation, each of the shielding wires has a strip-shaped structure or an S-shaped structure.

In an alternative implementation, the S-shaped structure comprises: a first linking part, a second linking part, a first extension part, a second extension part and a third extension part, wherein the first extension part, the second extension part and the third extension part extend in a first direction and are provided in parallel, the first extension part is connected to the first end of the shielding wire, and the third extension part is connected to the second end of the shielding wire;

the first linking part is provided closer to the displaying region, and is for linking the first extension part and the second extension part; and the second linking part is provided closer to the binding region, and is for linking the second extension part and the third extension part;

wherein the first direction is an extending direction of the touch-controlling lead wire or the data lead wire.

In an alternative implementation, each of the first ends of the shielding wires of the S-shaped structure is connected to one pin in the binding region.

In an alternative implementation, second ends of the shielding wires are provided closer to the binding region.

In an alternative implementation, each of the shielding wires has a U-shaped structure.

In an alternative implementation, the U-shaped structure comprises: a third linking part, and a fourth extension part and a fifth extension part that extend in the first direction and are provided in parallel, the fourth extension part is connected to the first end of the shielding wire, and the fifth extension part is connected to the second end of the shielding wire; and the third linking part is provided closer to the displaying region, and is for linking the fourth extension part and the fifth extension part;

wherein the first direction is an extending direction of the touch-controlling lead wire or the data lead wire.

In an alternative implementation, each of the shielding wires of the U-shaped structure is connected to one pin in the binding region.

In an alternative implementation, the shielding wire and the touch-controlling lead wire are arranged at a same layer, and a material of the shielding wire and a material of the touch-controlling lead wire are the same.

In an alternative implementation, a width of the shielding wire and a width of the touch-controlling lead wire are equal, and a spacing between two neighboring instances of the shielding wire and a spacing between two neighboring instances of the touch-controlling lead wire are equal.

In an alternative implementation, the touch-controlling lead wire and the data lead wire are located at different layers.

In an alternative implementation, the displaying region comprises a plurality of data lines and a plurality of scanning lines, the material of the touch-controlling lead wire and a material of the plurality of data lines are the same, and a material of the data lead wire and a material of the plurality of scanning lines are the same.

In an alternative implementation, the data lead wire comprises a first data lead wire and a second data lead wire that are provided alternately, and the first data lead wire and the second data lead wire are located at different layers.

The present disclosure further discloses a displaying device, wherein the displaying device comprises the displaying base plate stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure, the figures that are required to describe the embodiments of the present disclosure will be briefly introduced below. Apparently, the figures that are described below are embodiments of the present disclosure, and a person skilled in the art can obtain other figures according to these figures without paying creative work.

DETAILED DESCRIPTION

In order to make the above purposes, features and advantages of the present disclosure more apparent and understandable, the present disclosure will be described in further detail below with reference to the drawings and the particular embodiments.

Figure 1:
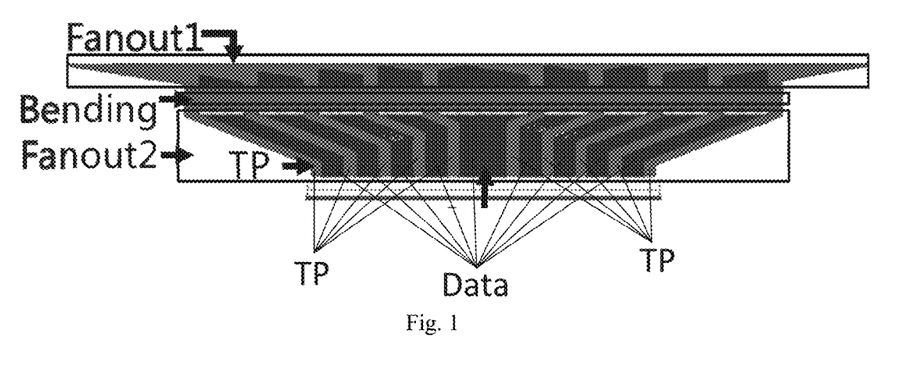
FIG. 1 shows a schematic diagram of the overall structure of the fanout region of a displaying base plate in the related art.

Referring to FIG. 1, the fanout region (comprising fanout1, a bending region and fanout2) of a TDDI product is provided with a touch-controlling lead wire TP and a data lead wire Data. Because a coupling capacitance exists between the touch-controlling lead wire TP and the data lead wire Data, the touch-controlling signal and the data signal have mutual interference therebetween.

Figure 2:
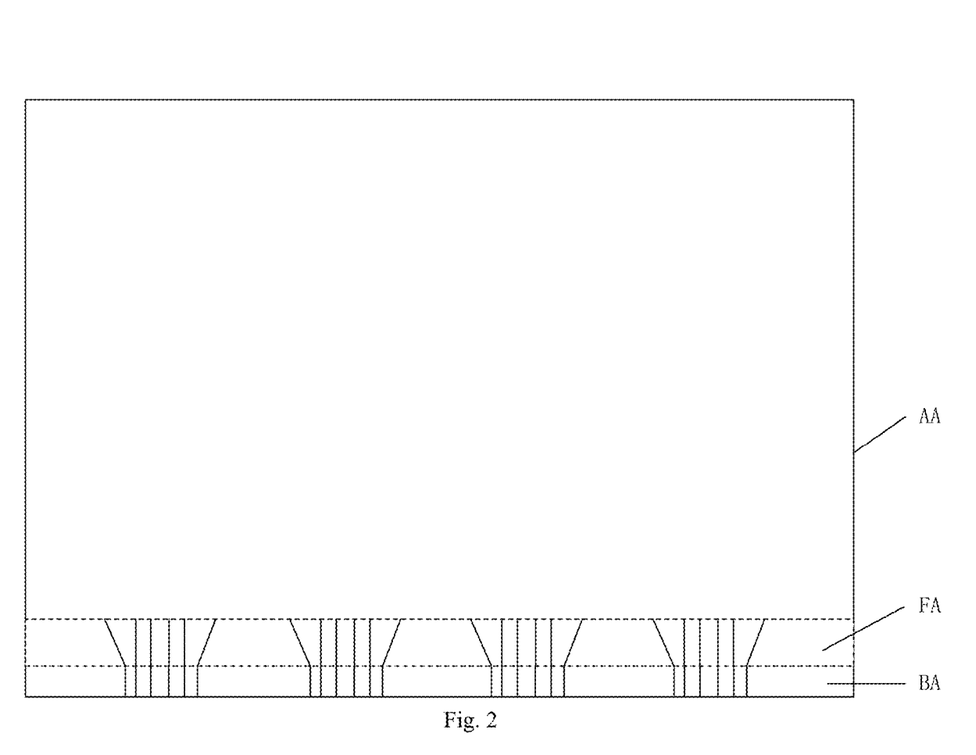
FIG. 2 shows a schematic structural diagram of the displaying base plate according to an embodiment of the present disclosure.
Figure 3:
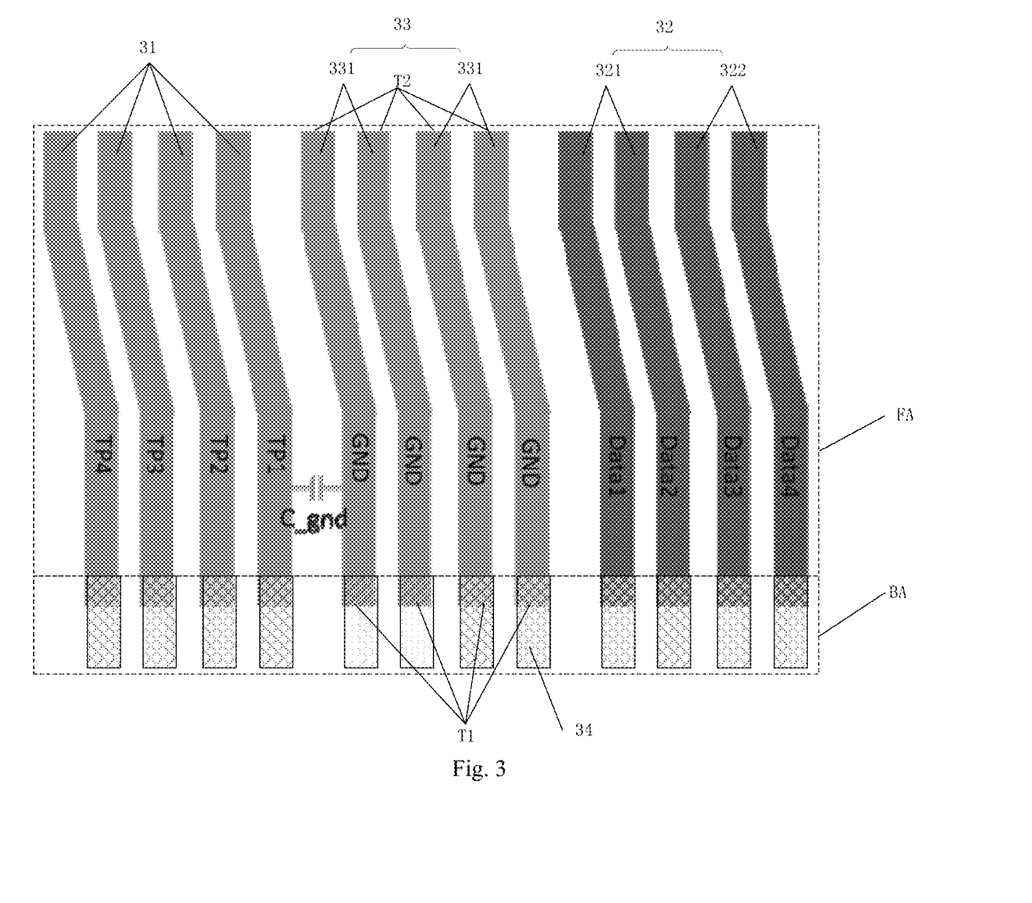
FIG. 3 shows a schematic structural diagram of a first type of fanout region according to an embodiment of the present disclosure.

In order to prevent the mutual interference between the two signals, an embodiment of the present disclosure provides a displaying base plate. Referring to FIG. 2, the displaying base plate comprises a displaying region AA, a binding region BA, and a fanout region FA located between the displaying region AA and the binding region BA. Referring to FIG. 3, the fanout region FA comprises a touch-controlling lead wire 31, a data lead wire 32, and at least one shielding wire 33 located between the touch-controlling lead wire 31 and the data lead wire 32, the at least one shielding wire 33 comprises a first shielding wire 331, and the first shielding wire 331 is earthed or is connected to a constant electric potential.

Referring to FIG. 3, between the touch-controlling lead wire 31 and the data lead wire 32 are provided four shielding wires 33, all of which are the first shielding wires 331. The first shielding wires 331 shown in FIG. 3 are earthed wirings (GND wirings).

The present embodiment, by providing the at least one first shielding wire 331 between the touch-controlling lead wire 31 and the data lead wire 32, shields the coupling capacitance between the touch-controlling lead wire 31 and the data lead wire 32, which prevents the signal jump in the touch-controlling lead wire from influencing the voltage level in the data lead wire, thereby ensuring that the displaying function is stable and normal.

The inventor has found that, although the provision of merely the first shielding wire 331, for example a GND wiring, between the touch-controlling lead wire 31 and the data lead wire 32 can shield the coupling capacitance between the touch-controlling lead wire 31 and the data lead wire 32, that simultaneously introduces the coupling capacitance between the touch-controlling lead wire 31 and the GND wiring, and the coupling capacitance C_gnd between the touch-controlling lead wire 31 and the GND wiring at a low electric potential causes the increasing of the load of the touch-controlling signal, which reduces the touch-controlling sensitivity of the TDDI product.

Figure 4:
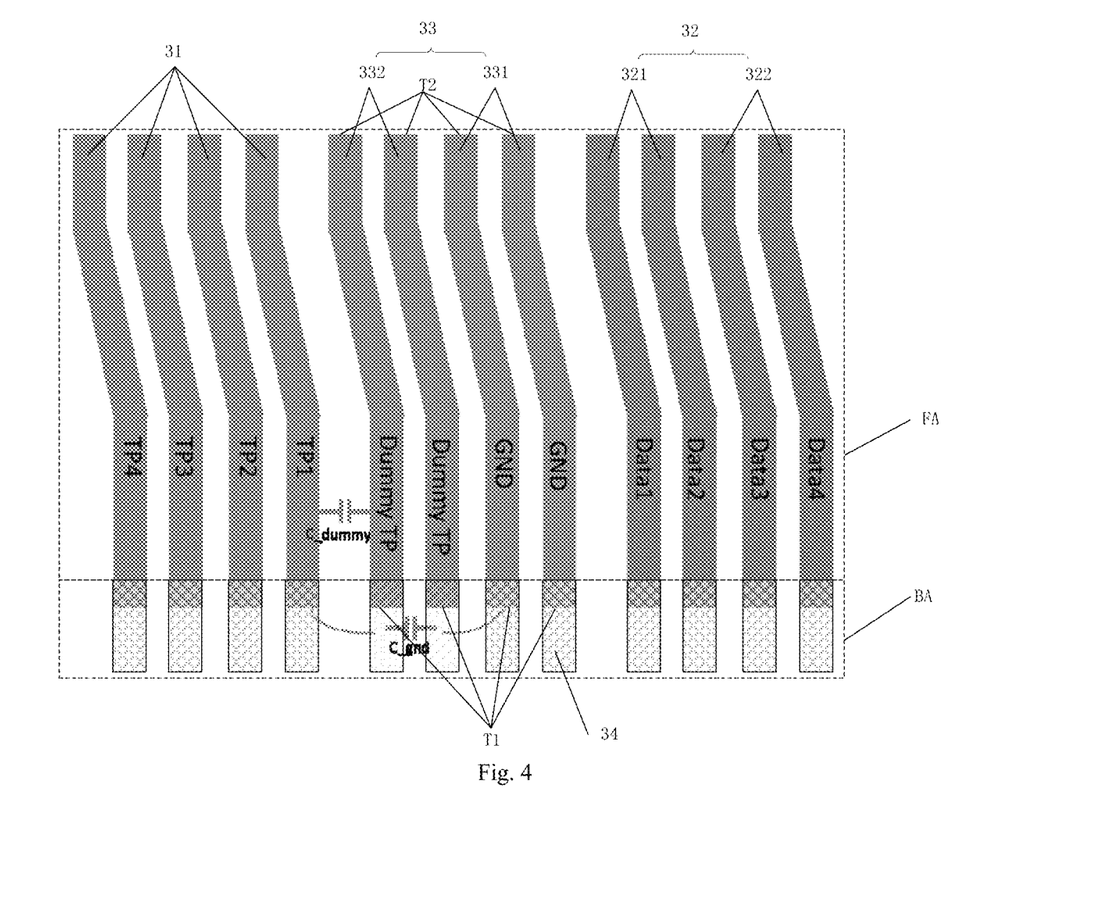
FIG. 4 shows a schematic structural diagram of a second type of fanout region according to an embodiment of the present disclosure.

In order to reduce the coupling capacitance between the touch-controlling lead wire and the data lead wire without reducing the touch-controlling sensitivity, an embodiment of the present disclosure provides another displaying base plate. Referring to FIG. 2, the displaying base plate comprises a displaying region AA, a binding region BA, and a fanout region FA located between the displaying region AA and the binding region BA. Referring to FIG. 4, the fanout region FA comprises a touch-controlling lead wire 31, a data lead wire 32, and a plurality of shielding wires 33 located between the touch-controlling lead wire 31 and the data lead wire 32, the plurality of shielding wires 33 include a second shielding wire 332 and a first shielding wire 331, the second shielding wire 332 is provided closer to the touch-controlling lead wire 31, the first shielding wire 331 is provided closer to the data lead wire 32, the first shielding wire 331 is earthed or is connected to a constant electric potential, and the second shielding wire 332 is configured for transmitting a signal the same as the touch-controlling signal in the touch-controlling lead wire 31.

In practical applications, the electric-potential level of the signal in the second shielding wire 332 may be equal to or similar to the electric-potential level of the touch-controlling signal in the touch-controlling lead wire 31. As shown in FIG. 4, the signal Dummy TP in the second shielding wire 332 may be a signal that is identical with and synchronous with the waveform of the touch-controlling signal TP, which can completely eliminate the coupling capacitance C_dummy between the second shielding wire 332 and the touch-controlling lead wire 31.

As shown in FIG. 4, between the touch-controlling lead wire 31 and the data lead wire 32 are provided four shielding wires 33, including two second shielding wires 332 closer to the touch-controlling lead wire 31, and two first shielding wires 331 closer to the data lead wire 32. It should be noted that, the quantities of the second shielding wires 332 and the first shielding wires 331 are not limited to two, the quantities of them may be the equal or different, and the particular quantities may be set according to actual situation, and are not limited in the present embodiment.

The shielding wires 33 shown in FIG. 4 have a strip-shaped structure. In practical applications, the shielding wires 33 may also have an S-shaped structure or a U-shaped structure and so on, and the particular structure of the shielding wires 33 is not limited in the present embodiment. The following embodiments will illustratively describe the particular structures of the shielding wires.

Because the first shielding wire 331 is earthed or is connected to a constant electric potential, that can reduce the coupling capacitance between the touch-controlling lead wire 31 and the data lead wire 32, and the coupling capacitance between the second shielding wire 332 and the data lead wire 32, which prevents the signal jump in the touch-controlling lead wire 31 or the second shielding wire 332 from influencing the voltage level in the data lead wire 32, thereby ensuring that the displaying function is stable and normal.

In addition, because the electric-potential level of the signal in the second shielding wire 332 may be equal to or similar to the electric-potential level of the touch-controlling signal in the touch-controlling lead wire 31, the coupling capacitance C_dummy between them can be negligible. Furthermore, the second shielding wire 332 results in the increasing of the distance between the touch-controlling lead wire 31 and the first shielding wire 331 (grounded or connected to a constant electric potential), and, as compared with the structure shown in FIG. 3, the structure shown in FIG. 4 can further reduce the coupling capacitance C_gnd between the touch-controlling lead wire 31 and the first shielding wire 331, thereby reducing the load of the touch-controlling signal in the touch-controlling lead wire 31, to increase the touch-controlling sensitivity of the displaying base plate.

In the displaying base plate according to the present embodiment, because the first shielding wire is earthed or is connected to a constant electric potential, the first shielding wire can shield the coupling capacitance between the touch-controlling lead wire or the second shielding wire and the data lead wire, which prevents the signal jump in the touch-controlling lead wire or the second shielding wire from influencing the voltage level in the data lead wire, thereby ensuring that the displaying function is stable and normal. In addition, because the electric-potential level of the signal in the second shielding wire is equal to or similar to the electric-potential level of the touch-controlling signal in the touch-controlling lead wire, the second shielding wire can shield the coupling capacitance between the touch-controlling lead wire and the first shielding wire, which can reduce the load of the touch-controlling signal in the touch-controlling lead wire, to increase the touch-controlling sensitivity.

In an alternative implementation, the shielding wires 33 and the touch-controlling lead wire 31 may be provided at the same layer, and the materials of the shielding wires 33 and the touch-controlling lead wire 31 may be the same.

In an alternative implementation, the width of the shielding wires 33 and the width of the touch-controlling lead wire 31 may be equal, and the spacing between two neighboring shielding wires 33 and the spacing between two neighboring touch-controlling lead wires 31 may be equal.

In order to further reduce the coupling capacitance between the touch-controlling lead wire 31 and the data lead wire 32, in an alternative implementation, the touch-controlling lead wire 31 and the data lead wire 32 may be located at different layers; in other words, the touch-controlling lead wire 31 and the data lead wire 32 are provided at different layers. When the shielding wires 33 and the touch-controlling lead wire 31 are provided at the same layer, the shielding wires 33 and the data lead wire 32 are also located at different layers, which can reduce the coupling capacitance between the second shielding wire 332 and the data lead wire 32.

The displaying region AA comprises a plurality of data lines and a plurality of scanning lines. In an alternative implementation, the material of the touch-controlling lead wire 31 and the material of the data lines may be the same, and the material of the data lead wire 32 and the material of the scanning lines may be the same. When the material of the touch-controlling lead wire 31 and the material of the data lines are the same, the material of the shielding wires 33 may also be the same as the material of the data lines.

In an alternative implementation, the data lead wire 32 may comprise a first data lead wire 321 and a second data lead wire 322 that are provided alternately, and the first data lead wire 321 and the second data lead wire 322 may be located at different layers. In a particular implementation, the first data lead wire 321 and the second data lead wire 322 may be provided at different film layers alternately one by one. By providing the first data lead wire 321 and the second data lead wire 322 alternately at different film layers, the wiring room of the fanout region FA can be increased, which prevents short circuit between the lead wires.

Figure 5:
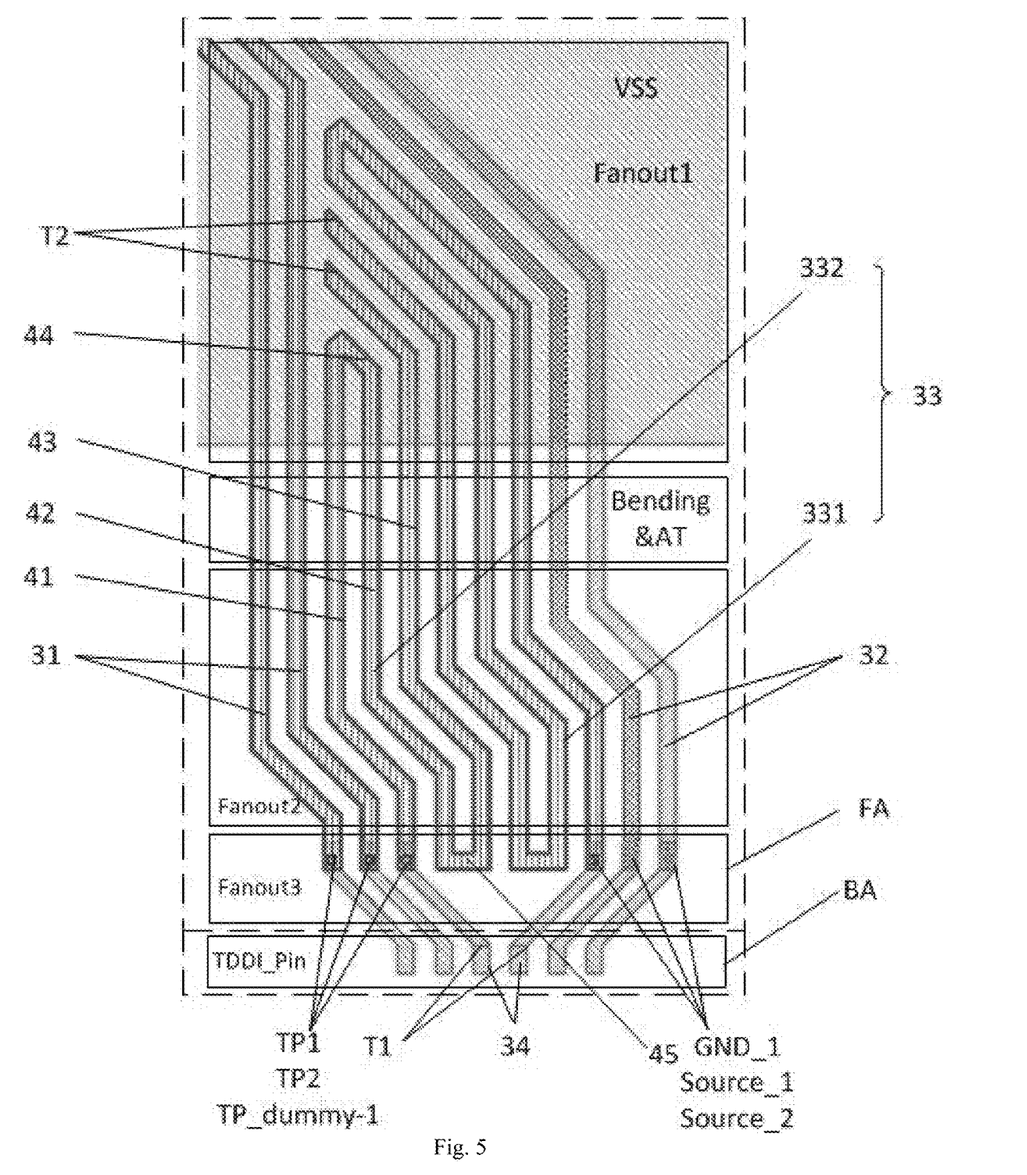
FIG. 5 shows a schematic structural diagram of a third type of fanout region according to an embodiment of the present disclosure.
Figure 6:
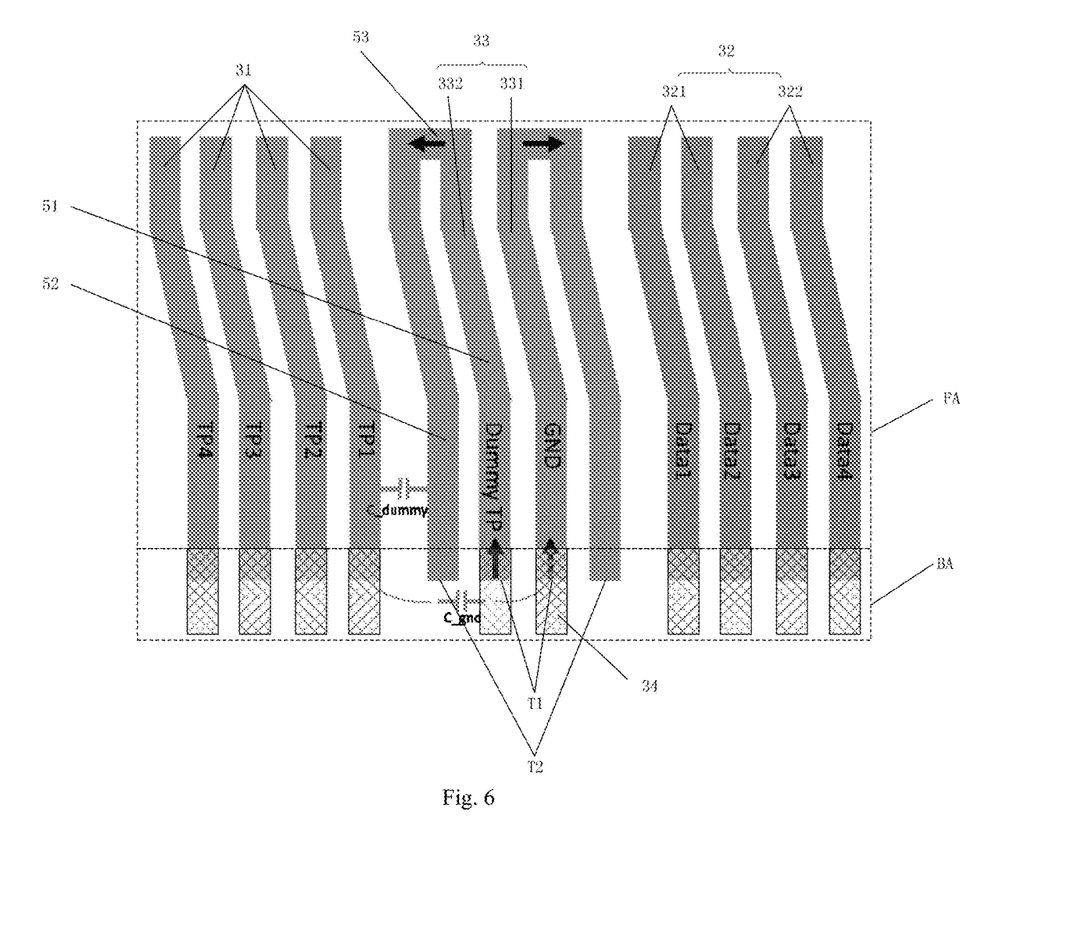
FIG. 6 shows a schematic structural diagram of a fourth type of fanout region according to an embodiment of the present disclosure.

In a particular implementation, referring to FIGS. 3 to 6, the first ends T1 of the shielding wires 33 are connected to different pins 34, and the pins 34 are located at the binding region BA. The second ends T2 of the shielding wires 33 may be provided closer to the displaying region AA (as shown in FIGS. 3, 3b and 5) or provided closer to the binding region BA (as shown in FIG. 6).

In an alternative implementation, when the second ends T2 of the shielding wires 33 are provided closer to the displaying region AA, each of the shielding wires 33 may have a strip-shaped structure (as shown in FIGS. 3 and 3b) or an S-shaped structure (as shown in FIG. 5).

Referring to FIGS. 3 and 3b, between the touch-controlling lead wire 31 and the data lead wire 32 are provided four shielding wires 33 of a strip-shaped structure, and the shielding wires 33 are connected to different pins 34 in the binding region BA; in other words, the four shielding wires 33 are connected to 4 pins 34.

Referring to FIG. 5, the S-shaped structure may comprise: a first extension part 41, a second extension part 42 and a third extension part 43 that extend in a first direction and are provided in parallel, a first linking part 44 that extends in a second direction, and a second linking part 45 that extends in a third direction. The first extension part 41 is connected to the first end T1 of the shielding wire 33. The third extension part 43 is connected to the second end T2 of the shielding wire 33. The first linking part 44 is provided closer to the displaying region AA, and is for linking the first extension part 41 and the second extension part 42. The second linking part 45 is provided closer to the binding region BA, and is for linking the second extension part 42 and the third extension part 43. The first direction is the extending direction of the touch-controlling lead wire 31 or the data lead wire 32. The second direction and the third direction may be any direction that is different from the first direction.

Referring to FIG. 5, the first extension part 41 is located between the first end T1 of the shielding wire 33 and the first linking part 44, the second extension part 42 is located between the first linking part 44 and the second linking part 45, and the third extension part 43 is located between the second linking part 45 and the second end T2 of the shielding wire 33.

Referring to FIG. 5, one second shielding wire 332 and one first shielding wire 331 are provided between the touch-controlling lead wire 31 and the data lead wire 32. Because the second shielding wire 332 has the S-shaped structure, and the touch-controlling lead wire 31 and the first shielding wire 331 are separated by the first extension part 41, the second extension part 42 and the third extension part 43, which is equivalent to that three shielding wires of the strip-shaped structure are provided between and separate the touch-controlling lead wire 31 and the first shielding wire 331, that can effectively shield the coupling capacitance between the touch-controlling lead wire 31 and the first shielding wire 331. Because the first shielding wire 331 has the S-shaped structure, and the second shielding wire 332 and the data lead wire 32 are separated by the three extension parts, which is equivalent to that three shielding wires of the strip-shaped structure are provided between and separate the second shielding wire 332 and the data lead wire 32, that can effectively shield the coupling capacitances individually between the touch-controlling lead wire 31 or the second shielding wire 332 and the data lead wire 32.

In addition, each of the shielding wires 33 of the S-shaped structure is merely required to connect to one of the pins 34 in the binding region BA to complete the signal accessing. Therefore, by using the shielding wires of the S-shaped structure, as compared with the shielding wires of the strip-shaped structure, the occupation of the pins can be reduced by two thirds, which effectively saves the pin space, while reaching the same effect of shielding.

In another alternative implementation, when the second ends of the shielding wires 33 are provided closer to the binding region BA, the shielding wires 33 are of a U-shaped structure (as shown in FIG. 6).

Referring to FIG. 6, the U-shaped structure may comprise: a fourth extension part 51 and a fifth extension part 52 that extend in the first direction and are provided in parallel, and a third linking part 53 that extends in the second direction. The fourth extension part 51 is connected to the first end T1 of the shielding wire 33. The fifth extension part 52 is connected to the second end T2 of the shielding wire 33. The third linking part 53 is provided closer to the displaying region AA, and is for linking the fourth extension part 51 and the fifth extension part 52. The first direction is the extending direction of the touch-controlling lead wire 31 or the data lead wire 32. The second direction may be any direction that is different from the first direction.

Referring to FIG. 6, the fourth extension part 51 is located between the first end T1 of the shielding wire 33 and the third linking part 53, and the fifth extension part 52 is located between the third linking part 53 and the second end T2 of the shielding wire 33.

Referring to FIG. 6, one second shielding wire 332 and one first shielding wire 331 are provided between the touch-controlling lead wire 31 and the data lead wire 32. Because the second shielding wire 332 has the U-shaped structure, and the touch-controlling lead wire 31 and the first shielding wire 331 are separated by the fourth extension part 51 and the fifth extension part 52, which is equivalent to that two shielding wires of the strip-shaped structure are provided between and separate the touch-controlling lead wire 31 and the first shielding wire 331, that can effectively shield the coupling capacitance between the touch-controlling lead wire 31 and the first shielding wire 331. Because the first shielding wire 331 has the U-shaped structure, and the second shielding wire 332 and the data lead wire 32 are separated by the two extension parts, which is equivalent to that two shielding wires of the strip-shaped structure are provided between and separate the second shielding wire 332 and the data lead wire 32, that can effectively shield the coupling capacitances individually between the touch-controlling lead wire 31 or the second shielding wire 332 and the data lead wire 32.

In addition, each of the shielding wires 33 of the U-shaped structure is merely required to connect to one of the pins 34 in the binding region BA to complete the signal accessing. Therefore, by using the shielding wires of the U-shaped structure, as compared with the shielding wires of the strip-shaped structure, the occupation of the pins can be reduced by a half, which effectively saves the pin space, while reaching the same effect of shielding.

In the present embodiment, the structure of the shielding wire is described merely by taking the strip-shaped structure, the S-shaped structure and the U-shaped structure as examples, but the structure of the shielding wire is not limited thereto. In practical applications, the structure of the shielding wire may be designed according to the factors such as the wiring room and the pin restriction, aiming at as much extension parts separating the touch-controlling lead wire 31 and the data lead wire 32 as possible (in order for a good effect of shielding) and as little pins that are connected as possible (in order to save the pin space). The particular structure and quantity of the shielding wires are not limited in the present embodiment.

Another embodiment of the present disclosure further provides a displaying device, wherein the displaying device comprises the displaying base plate according to any one of the above embodiments.

It should be noted that, the displaying device according to the present embodiment may be a display panel, an electronic paper, a mobile phone, a tablet personal computer, a TV set, a notebook computer, a digital photo frame, a navigator and any other products or components that have the function of 2D or 3D displaying.

The displaying device according to the present embodiment comprises the displaying base plate according to any one of the above embodiments. The displaying base plate comprises a displaying region, a binding region, and a fanout region located between the displaying region and the binding region, the fanout region comprises a touch-controlling lead wire, a data lead wire, and at least one shielding wire located between the touch-controlling lead wire and the data lead wire, the at least one shielding wire includes a first shielding wire, and the first shielding wire is earthed or is connected to a constant electric potential. Because the first shielding wire is earthed or is connected to a constant electric potential, the first shielding wire can shield the coupling capacitance between the touch-controlling lead wire and the data lead wire, which prevents the signal jump in the touch-controlling lead wire from influencing the voltage level in the data lead wire, thereby ensuring that the displaying function is stable and normal.

Optionally, in order not to reduce the touch-controlling sensitivity, the fanout region may comprise a plurality of shielding wires located between the touch-controlling lead wire and the data lead wire, the plurality of shielding wires include a second shielding wire and a first shielding wire, the second shielding wire is provided closer to the touch-controlling lead wire, the difference between the input signal of the second shielding wire and the input signal of the touch-controlling lead wire is less than a preset threshold, the first shielding wire is provided closer to the data lead wire, and the first shielding wire is earthed or is connected to a constant electric potential. Because the first shielding wire is earthed or is connected to a constant electric potential, the first shielding wire can shield the coupling capacitance between the touch-controlling lead wire or the second shielding wire and the data lead wire, which prevents the signal jump in the touch-controlling lead wire or the second shielding wire from influencing the voltage level in the data lead wire, thereby ensuring that the displaying function is stable and normal. Furthermore, because the difference between the input signal of the second shielding wire and the input signal of the touch-controlling lead wire is less than a preset threshold, the second shielding wire can shield the coupling capacitance between the touch-controlling lead wire and the first shielding wire, which can reduce the load of the touch-controlling signal in the touch-controlling lead wire, to increase the touch-controlling sensitivity.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The displaying base plate and the displaying device according to the present disclosure have been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. A displaying base plate, wherein the displaying base plate comprises a displaying region, a binding region, and a fanout region located between the displaying region and the binding region; and
the fanout region comprises a touch-controlling lead wire, a data lead wire, and at least one shielding wire located between the touch-controlling lead wire and the data lead wire, the at least one shielding wire includes a first shielding wire, and the first shielding wire is earthed or is connected to a constant electric potential;
wherein the fanout region comprises a plurality of instances of the shielding wire, the plurality of shielding wires include a second shielding wire, the second shielding wire is provided closer to the touch-controlling lead wire, the first shielding wire is provided closer to the data lead wire, and the second shielding wire is configured for transmitting a signal the same as a touch-controlling signal in the touch-controlling lead wire.

2. The displaying base plate according to claim 1, wherein first ends of the shielding wires are connected to different pins, and the pins are located at the binding region.

3. The displaying base plate according to claim 2, wherein second ends of the shielding wires are provided closer to the displaying region.

4. The displaying base plate according to claim 3, wherein each of the shielding wires has a strip-shaped structure or an S-shaped structure.

5. The displaying base plate according to claim 4, wherein the S-shaped structure comprises: a first linking part, a second linking part, a first extension part, a second extension part and a third extension part, wherein the first extension part, the second extension part and the third extension part extend in a first direction and are provided in parallel, the first extension part is connected to the first end of each shielding wire, and the third extension part is connected to the second end of each shielding wire;
the first linking part is provided closer to the displaying region, and is for linking the first extension part and the second extension part; and
the second linking part is provided closer to the binding region, and is for linking the second extension part and the third extension part;
wherein the first direction is an extending direction of the touch-controlling lead wire or the data lead wire.

6. The displaying base plate according to claim 5, wherein each of the first ends of the shielding wires of the S-shaped structure is connected to one pin in the binding region.

7. The displaying base plate according to claim 2, wherein second ends of the shielding wires are provided closer to the binding region.

8. The displaying base plate according to claim 7, wherein each of the shielding wires has a U-shaped structure.

9. The displaying base plate according to claim 8, wherein the U-shaped structure comprises: a third linking part, and a fourth extension part and a fifth extension part that extend in a first direction and are provided in parallel, the fourth extension part is connected to the first end of each shielding wire, and the fifth extension part is connected to the second end of each shielding wire; and
the third linking part is provided closer to the displaying region, and is for linking the fourth extension part and the fifth extension part;
wherein the first direction is an extending direction of the touch-controlling lead wire or the data lead wire.

10. The displaying base plate according to claim 9, wherein each of the shielding wires of the U-shaped structure is connected to one pin in the binding region.

11. The displaying base plate according to claim 1, wherein the shielding wire and the touch-controlling lead wire are arranged at a same layer, and a material of the shielding wire and a material of the touch-controlling lead wire are the same.

12. The displaying base plate according to claim 11, wherein a width of the shielding wire and a width of the touch-controlling lead wire are equal, and a spacing between two neighboring instances of the shielding wire and a spacing between two neighboring instances of the touch-controlling lead wire are equal.

13. The displaying base plate according to claim 11, wherein the touch-controlling lead wire and the data lead wire are located at different layers.

14. The displaying base plate according to claim 13, wherein the displaying region comprises a plurality of data lines and a plurality of scanning lines, the material of the touch-controlling lead wire and a material of the plurality of data lines are the same, and a material of the data lead wire and a material of the plurality of scanning lines are the same.

15. The displaying base plate according to claim 14, wherein the data lead wire comprises a first data lead wire and a second data lead wire that are provided alternately, and the first data lead wire and the second data lead wire are located at different layers.

16. A displaying device, wherein the displaying device comprises the displaying base plate according to claim 1.

* * * * *